United States Patent
Sasaki et al.

(10) Patent No.: US 7,290,734 B2
(45) Date of Patent: Nov. 6, 2007

(54) TAPE REEL AND INFORMATION RECORDING MEDIUM

(75) Inventors: Morimasa Sasaki, Tokyo (JP); Takateru Satoh, Tokyo (JP); Akio Momoi, Tokyo (JP); Chotaro Kouzu, Tokyo (JP)

(73) Assignee: TDK Corporation, Tokyo (JP)

( * ) Notice: Subject to any disclaimer, the term of this patent is extended or adjusted under 35 U.S.C. 154(b) by 352 days.

(21) Appl. No.: 11/016,910

(22) Filed: Dec. 21, 2004

(65) Prior Publication Data

US 2005/0205708 A1 Sep. 22, 2005

(30) Foreign Application Priority Data

Dec. 22, 2003 (JP) ............................. 2003-424815
May 27, 2004 (JP) ............................. 2004-156978

(51) Int. Cl.
*B65H 75/08* (2006.01)
*G11B 23/04* (2006.01)

(52) U.S. Cl. ................ 242/613.4; 242/338.1; 242/348

(58) Field of Classification Search ............ 242/338.1, 242/348, 348.2, 609, 613, 613.4
See application file for complete search history.

(56) References Cited

U.S. PATENT DOCUMENTS

| 6,581,866 B2 * | 6/2003 | Tsuyuki et al. ............. 242/348 |
| 6,651,917 B2 | 11/2003 | Momoi et al. |
| 6,685,123 B2 * | 2/2004 | Tsuyuki et al. ............. 242/348 |
| 6,745,968 B1 * | 6/2004 | Schoettle et al. ............ 242/348 |
| 6,959,888 B2 * | 11/2005 | Tsuyuki et al. ............. 242/348 |
| 7,059,554 B2 * | 6/2006 | Hiraguchi et al. .......... 242/348 |
| 7,124,973 B2 * | 10/2006 | Hiraguchi ................ 242/338.1 |
| 2002/0047063 A1 | 4/2002 | Kaneda et al. |
| 2002/0185563 A1 * | 12/2002 | Tsuyuki et al. ............. 242/348 |

FOREIGN PATENT DOCUMENTS

| JP | 2002-100148 | 4/2002 |
| JP | 2004-014022 | 1/2004 |
| JP | 2004-014023 | 1/2004 |
| JP | 2004-127358 | 4/2004 |

OTHER PUBLICATIONS

English language Abstract of JP 2002-100148.
English language Abstract of JP 2004-014022.
English language Abstract of JP 2004-127358.
U.S. Appl. No. 11/016,910 to Sasaki et al., which was filed on Dec. 21, 2004.
English language Abstract of JP 2004-014023.

* cited by examiner

*Primary Examiner*—William A. Rivera
(74) *Attorney, Agent, or Firm*—Greenblum & Bernstein, P.L.C.

(57) ABSTRACT

A tape reel includes: a hub in the shape of a bottomed-cylinder with a disc-like lower flange integrally formed at a lower end thereof and an opening formed at an upper end thereof; and an upper flange that is disc-like, has a center hole formed therein, and has a ring-shaped protrusion formed so as to protrude at a rim of the center hole, the protrusion being fitted into and fixed at the opening of the hub. The hub includes a plurality of reinforcing ribs that are respectively formed in an up-down direction on an inner circumferential surface of the hub.

6 Claims, 8 Drawing Sheets

TAPE REEL AND INFORMATION RECORDING MEDIUM

BACKGROUND OF THE INVENTION

1. Field of the Invention

The present invention relates to a tape reel around which magnetic tape for recording information is wound and to an information recording medium equipped with such tape reel.

2. Description of the Related Art

As one example of an information recording medium that can record a large amount of data, in Japanese Laid-Open Patent Publication No. 2002-100148, the present applicant has disclosed a single-reel-type tape cartridge according to LTO (Linear Tape Open) standard. This tape cartridge is constructed of a main case including an upper case and a lower case that can engage one another, a single tape reel that is rotatably enclosed inside the main case and around which a magnetic tape (tape) is wound, and the like. In this case, the tape reel is constructed of an upper flange and a hub in the shape of a bottomed cylinder at whose lower end a lower flange is integrally formed.

By investigating the above technology, the present inventors discovered the following problem to be solved. That is, the tape reel in the tape cartridge is manufactured by injection molding resin. Here, to prevent damage to or stretching of the magnetic tape during winding, it is preferable for an outer circumferential surface of the hub to be formed smooth. Accordingly, to prevent the production of convexes and concaves in the outer circumferential surface of the hub due to "sinking" during injection molding, the hub of the tape reel is formed comparatively thinly. On the other hand, when the magnetic tape is wound around the tape reel, a constant tension is applied to the magnetic tape to prevent the production of wrinkles due to the tape becoming slack. This means that in a state where the magnetic tape has been wound out, a large force is applied to the hub due to the magnetic tape being tightened. As a result, as shown in FIG. 20, a hub 332 that is formed thinly is caused to deform slightly due to such force, and as the hub 332 deforms, there is the risk of the front end of an upper flange 331 becoming inclined downward and the front end of a lower flange 333 becoming inclined upward. Accordingly, to prevent the upper flange 331 and the lower flange 333 from contacting the ends of the magnetic tape T, sufficient clearance should preferably be provided between the upper flange 331 and the lower flange 333.

SUMMARY OF THE INVENTION

The present invention was conceived in view of the above problem to be solved, and it is a principal object of the present invention to provide a tape reel and an information recording medium where sufficient clearance can be maintained between ends of a magnetic tape and flanges, even when the magnetic tape has been wound out.

To achieve the stated object, a tape reel according to the present invention includes: a hub in the shape of a bottomed-cylinder with a disc-like lower flange integrally formed at a lower end thereof and an opening formed at an upper end thereof; and an upper flange that is disc-like, has a center hole formed therein, and has a ring-shaped protrusion formed so as to protrude at a rim of the center hole, the protrusion being fitted into and fixed at the opening of the hub, wherein the hub includes a plurality of reinforcing ribs that are respectively formed in an up-down direction on an inner circumferential surface of the hub.

In this tape reel, a plurality of reinforcing ribs are formed in the up-down direction on the inner circumferential surface of the hub. Since the hub can be provided with sufficient rigidity, even if a large force is applied to the hub due to the magnetic tape being tightened, it is possible to keep the hub in a non-deformed state or a state that is only slightly deformed. Accordingly, since it is possible to prevent inclination of the upper flange and lower flange toward the magnetic tape side as the hub deforms, it is possible to maintain sufficient clearance between the ends of the magnetic tape and the two flanges even when the magnetic tape is tightened.

Here, the plurality of reinforcing ribs may be formed so as to respectively protrude toward a center axis of the hub from the inner circumferential surface and the hub may include at least one reinforcing wall member formed so as to connect front ends of the respective reinforcing ribs and to face the inner circumferential surface. With this construction, it is possible to increase the rigidity of the hub with respect to a force applied toward the center axis of the hub, so that even if a large force is applied to the hub due to the magnetic tape being tightened, it is possible to reliably keep the hub in a non-deformed state or a state that is only slightly deformed. Accordingly, since it is possible to reliably prevent inclination of the upper flange and lower flange toward the magnetic tape side as the hub deforms, it is possible to maintain sufficient clearance between the ends of the magnetic tape and the two flanges even when the magnetic tape is tightened.

Here, the upper flange may be constructed so as to include a ring-shaped brim that is formed on the protrusion. With this construction, even if the hub deforms slightly, the protrusion can be reliably supported from the inside by the ring-shaped brim, which means that it is possible to reliably prevent inclination of the upper flange toward the magnetic tape side as the hub deforms. As a result, it is possible to reliably maintain sufficient clearance between the front end of the upper flange and the magnetic tape.

It is also possible to construct the upper flange by forming the rim of the center hole thicker than other parts aside from the rim. With this construction, it is possible to provide the rim of the upper flange with sufficient rigidity, so that even if the hub slightly deforms, inclination of the upper flange toward the magnetic tape side as the hub deforms can be reliably prevented.

The upper flange may also include: a ring-shaped groove formed in an upper surface of the rim so as to surround the center hole and a plurality of ribs formed inside the groove. With this construction, it is possible to reduce the weight of the upper flange and to prevent the occurrence of sinking at the rim while maintaining the rigidity of the rim.

In addition, the upper flange may also include: a ring-shaped groove formed in a lower surface of the protrusion so as to surround the center hole; and a plurality of ribs formed inside the groove. With this construction, it is possible to reduce the weight of the upper flange and to prevent the occurrence of sinking at the protrusion while maintaining the rigidity of the rim.

The hub may include a disc-shaped reinforcing member that is fixed to the reinforcing ribs. With this construction, it is possible to reliably support the hub from inside with the disc-shaped reinforcing member, so that deformation of the hub due to the magnetic tape being tightened can be reliably prevented.

Another tape reel according to the present invention includes: a hub in the shape of a bottomed-cylinder with a disc-like lower flange integrally formed at a lower end thereof and an opening formed at an upper end thereof; and an upper flange that is disc-like, has a center hole formed therein, and has a ring-shaped protrusion formed so as to protrude at a rim of the center hole, the protrusion being fitted into and fixed at the opening of the hub, wherein a cylindrical reinforcing member is fitted into the hub so that an outer circumferential surface thereof contacts an inner circumferential surface of the hub.

In this tape reel, the cylindrical reinforcing member is fitted into the hub so that the outer circumferential surface thereof contacts the inner circumferential surface of the hub. As a result, it is possible to support the hub from an inside using the cylindrical reinforcing member, so that it is possible to reliably prevent deformation of the hub due to the magnetic tape being tightened.

In this case, the cylindrical reinforcing member may include a ring-shaped reinforcing plate formed on an inner circumferential surface thereof. With this construction, it is possible to increase the rigidity of the reinforcing member, so that the hub can be reliably supported from the inside.

The cylindrical reinforcing member may be formed of metal. With this construction, it is possible to form the reinforcing member thinly while maintaining the rigidity thereof.

Another tape reel according to the present invention includes: a hub in the shape of a bottomed-cylinder with a disc-like lower flange integrally formed at a lower end thereof and an opening formed at an upper end thereof; and an upper flange that is disc-like, has a center hole formed therein, and has a ring-shaped protrusion formed so as to protrude at a rim of the center hole, the protrusion being fitted into and fixed at the opening of the hub, wherein the upper flange includes a ring-shaped brim formed on the protrusion.

In this tape reel, the ring-shaped brim is formed on the protrusion of the upper flange. This means that even if the hub slightly deforms, the protrusion can be reliably supported from an inside by the ring-shaped brim, and as a result, it is possible to reliably prevent inclination of the upper flange toward the magnetic tape side as the hub deforms. As a result, it is possible to reliably maintain sufficient clearance between the front end of the upper flange and the magnetic tape.

Another tape reel according to the present invention includes: a hub in the shape of a bottomed-cylinder with a disc-like lower flange integrally formed at a lower end thereof and an opening formed at an upper end thereof; and an upper flange that is disc-like, has a center hole formed therein, and has a ring-shaped protrusion formed so as to protrude at a rim of the center hole, the protrusion being fitted into and fixed at the opening of the hub, wherein the upper flange includes a cylindrical reinforcing member formed on the protrusion, and the reinforcing member includes a plurality of ribs respectively formed in an up-down direction on an outer circumferential surface thereof.

In this tape reel, the cylindrical reinforcing member, on whose outer circumferential surface the plurality of ribs are respectively formed in an up-down direction, is formed on the protrusion of the upper flange. This means that even if the hub deforms slightly, the protrusion can be reliably supported by the reinforcing member, so that inclination of the upper flange toward the magnetic tape side as the hub deforms can be reliably prevented.

Another tape reel according to the present invention includes: a hub in the shape of a bottomed-cylinder with a disc-like lower flange integrally formed at a lower end thereof and an opening formed at an upper end thereof; and an upper flange that is disc-like, has a center hole formed therein, and has a ring-shaped protrusion formed so as to protrude at a rim of the center hole, the protrusion being fitted into and fixed at the opening of the hub, wherein the upper flange is constructed by forming the rim of the center hole thicker than other parts aside from the rim.

In this tape reel, the rim of the center hole in the upper flange is formed thicker than other parts. Since the rim of the upper flange is provided with sufficient rigidity, even if the hub deforms slightly, inclination of the upper flange toward the magnetic tape side as the hub deforms can be reliably prevented.

Here, the upper flange may include: a ring-shaped groove formed in an upper surface of the rim so as to surround the center hole; and a plurality of ribs formed inside the groove. With this construction, it is possible to reduce the weight of the upper flange and to prevent the occurrence of sinking at the rim while maintaining the rigidity of the rim.

Here, the upper flange may include: a ring-shaped groove formed in a lower surface of the protrusion so as to surround the center hole; and a plurality of ribs formed inside the groove. With this construction, it is possible to reduce the weight of the upper flange and to prevent the occurrence of sinking at the protrusion while maintaining the rigidity of the rim.

An information recording medium according to the present invention includes a tape reel that includes: a hub in the shape of a bottomed-cylinder with a disc-like lower flange integrally formed at a lower end thereof and an opening formed at an upper end thereof, a plurality of reinforcing ribs being formed in an up-down direction on an inner circumferential surface of the hub; and an upper flange that is disc-like, has a center hole formed therein, and has a ring-shaped protrusion formed so as to protrude at a rim of the center hole, the protrusion being fitted into and fixed at the opening of the hub.

In this information recording medium, a plurality of reinforcing ribs are formed in the up-down direction on the inner circumferential surface of the hub of the tape reel. Since the hub can be provided with sufficient rigidity, even if a large force is applied to the hub due to the magnetic tape being tightened, it is possible to keep the hub in a non-deformed state or a state that is only slightly deformed. According to this information recording medium, since it is possible to prevent inclination of the upper flange and lower flange toward the magnetic tape side as the hub deforms, it is possible to maintain sufficient clearance between the ends of the magnetic tape and the two flanges even when the magnetic tape is tightened.

BRIEF DESCRIPTION OF THE DRAWINGS

These and other objects and features of the present invention will be explained in more detail below with reference to the attached drawings, wherein:

FIG. 12 is a perspective view of another upper flange;

FIG. 13 is a cross-sectional view of another tape reel;

FIG. 14 is a perspective view of another upper flange;

DESCRIPTION OF THE PREFERRED EMBODIMENTS

Preferred embodiments of a tape reel and an information recording medium according to the present invention will now be described with reference to the attached drawings.

First, the construction of an information recording medium 1 will be described with reference to the drawings.

Figure 1:
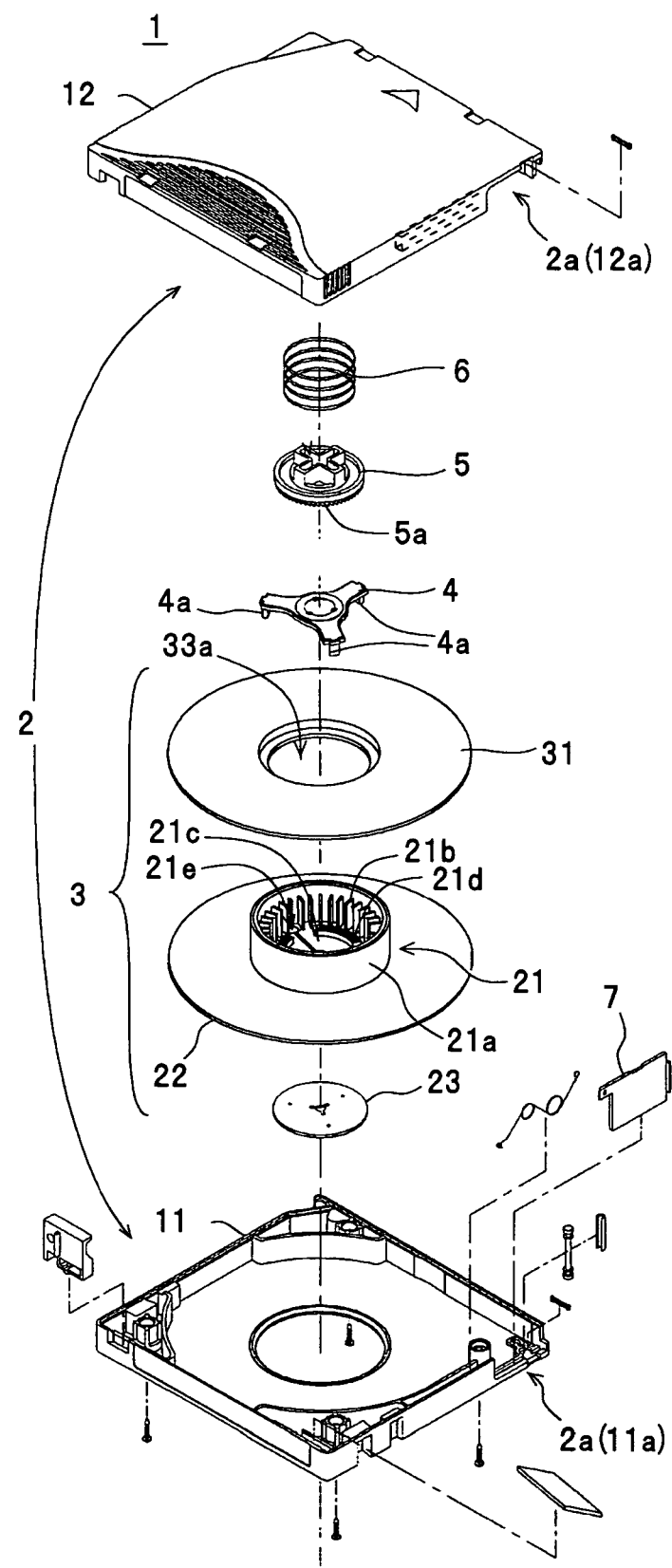
FIG. 1 is an exploded perspective view of an information recording medium.

The information recording medium 1 shown in FIG. 1 is a single-reel, cartridge-type information recording medium used according to LTO standard that is used as a storage device for backing-up recording data that has been recorded by a computer, for example. As shown in FIG. 1, the information recording medium 1 includes a case main body 2, a tape reel 3, a brake releasing plate 4, a locking member 5, a brake spring 6, and a door member 7. It should be noted that in reality, a magnetic tape T is wound around the tape reel 3 in the information recording medium 1 (see FIG. 4), but such magnetic tape T has been omitted from FIG. 1 for ease of understanding the construction of the respective parts.

As shown in FIG. 1, the case main body 2 is constructed of a lower case 11 and an upper case 12 that are respectively formed in the shape of shallow plates and can engage one another. The case main body 2 encloses the tape reel 3 in an internal space formed when the upper case 11 and the lower case 12 engage one another so that the tape reel 3 is rotatable. Here, cutaway parts 11a, 12a, which construct a tape withdrawal opening 2a for withdrawing the magnetic tape T wound around the tape reel 3 (see FIG. 4) to the outside, are respectively formed in the lower case 11 and the upper case 12.

Figure 2:
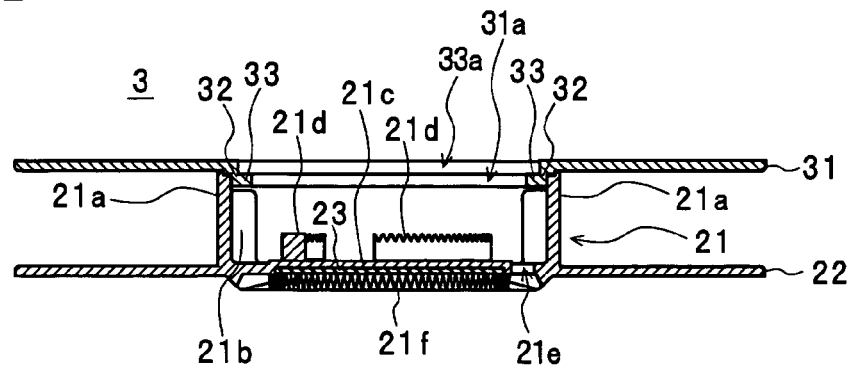
FIG. 2 is a cross-sectional view of a tape reel.
Figure 3:
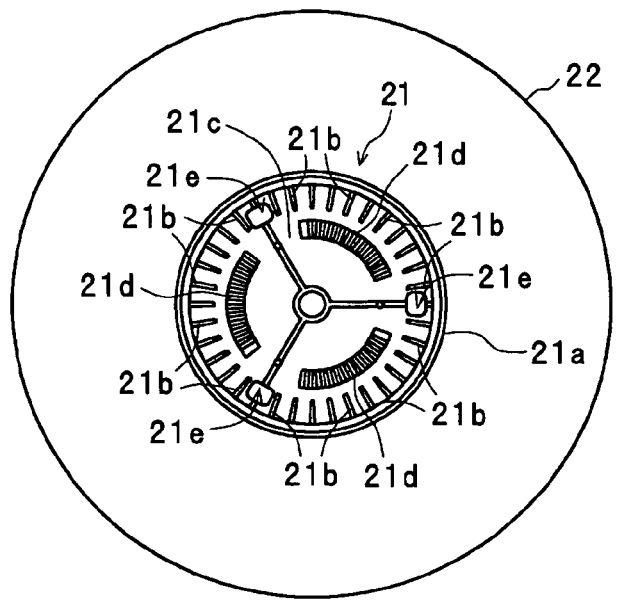
FIG. 3 is a plan view of a hub and a lower flange.

As shown in FIGS. 1 and 2, the tape reel 3 includes a hub 21, a lower flange 22, and an upper flange 31. The hub 21 is shaped as a bottomed cylinder where an opening is formed at an upper end, and is constructed so that the magnetic tape T can be wound around a circumference thereof. Also, as shown in FIGS. 1 and 3, a plurality of reinforcing ribs 21b are integrally formed in an up-down direction (a direction from an upper end to a lower end) at equal intervals on an inner circumferential surface of a trunk part 21a of the hub 21. Also, as shown in FIGS. 2 and 3, teeth 21d that are arc-shaped when viewed from above and engage the locking member 5 energized by the brake spring 6 (for both see FIG. 1) are formed on an inner surface (upper surface) of a base plate 21c of the hub 21. In addition, insertion through-holes 21e for attaching the brake releasing plate 4 so as to be capable of up-down movement are formed in the base plate 21c of the hub 21. As shown in FIG. 2, a metal plate 23 (also see FIG. 1) is attached to an outer surface (lower surface) of the base plate 21c of the hub 21 so that a drive shaft of a drive apparatus, not shown, and the tape reel 3 can be chucked by magnetic attraction. On the outer surface of the base plate 21c, ring-shaped teeth 21f that can engage teeth on the drive shaft of the drive apparatus are formed so as to surround the metal plate 23. As shown in FIG. 3, the lower flange 22 is constructed in a disc shape and is integrally formed with the lower end of the hub 21.

Figure 4:
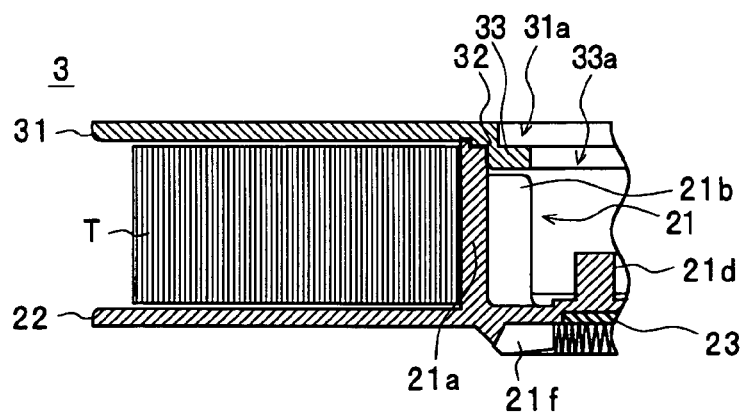
FIG. 4 is a cross-sectional view of a tape reel around which a magnetic tape has been wound.

As shown in FIGS. 2 and 4, the upper flange 31 is constructed in a disc shape and has a circular center hole 31a formed in a center part thereof. At a rim of the center hole 31a in the upper flange 31, a ring-shaped protrusion 32 is formed so as to protrude downward. In addition, a brim 33 in the form of a disc in whose center a center hole 33a, through which the locking member 5 and the brake releasing plate 4 can pass, has been formed (i.e., the brim 33 is ring-shaped) is integrally formed at a lower end of the protrusion 32 so as to be substantially parallel with the upper flange 31. In this case, as shown in FIG. 2, the hub 21 and the upper flange 31 are fixed together by ultrasonic welding, for example, in a state where the protrusion 32 has been fitted into the opening at the upper end of the trunk part 21a.

As shown in FIG. 1, the brake releasing plate 4 is constructed so as to have three legs 4a that can pass through the insertion through-holes 21e of the hub 21 erected on a rear surface thereof. Here, by inserting the legs 4a through the respective insertion through-holes 21e of the hub 21, the brake releasing plate 4 is attached on the base plate 21c side of the hub 21 so as to be capable of up-down movement but incapable of rotation. As shown in FIG. 1, teeth 5a that can engage the teeth 21d of the hub 21 are formed on the base surface of the locking member 5. Here, the locking member 5 is energized by the brake spring 6 and stops rotation of the tape reel 3 due to the teeth 5a engaging the teeth 21d of the hub 21. The brake spring 6 is composed of a coil spring, is disposed between the upper case 12 and the locking member 5, and energizes the locking member 5 toward the base plate 21c of the hub 21 of the tape reel 3. Also, as shown in FIG. 1, the door member 7 is formed of a thin plate that can close the tape withdrawal opening 2a and is enclosed in guide channels respectively formed in a side wall of the lower case 11 and a side wall of the upper case 12 so as to be able to slide.

Next, the operation of the information recording medium 1 during recording and reproduction will be described with reference to the drawings.

When the information recording medium 1 is loaded into a drive apparatus, not shown, the door member 7 is slid to open the tape withdrawal opening 2a and the magnetic tape T is withdrawn. Next, while a tape reel inside the drive apparatus winds the magnetic tape T, a recording/reproduction unit of the drive apparatus carries out the recording of recording data on the magnetic tape T or the reading of recording data from the magnetic tape T. After this, once the recording and/or reading of recording data has ended, the drive apparatus rotates the tape reel 3 to start winding the magnetic tape T (the winding of the magnetic tape T back into the information recording medium 1). At this point, to prevent a slackening of the tape, the drive apparatus controls the rotation of the tape reel inside the drive apparatus, for example, so that a constant tension is applied to the magnetic tape T. By doing so, the magnetic tape T is wound back onto the tape reel 3. At this time, since tension is applied to the magnetic tape T, quite a large force is applied to the trunk part 21a of the hub 21 toward a center thereof due to the magnetic tape T being tightened. On the other hand, the hub 21 has sufficient rigidity due to the reinforcing ribs 21b being formed on the inner circumferential surface of the trunk part 21a. Accordingly, even if a large force is applied to the trunk part 21a due to the magnetic tape T being tightened, as shown in FIG. 4, the hub 21 resists the force and maintains a non-deformed state. Alternatively, even if the hub 21 does deform, the deformation can be suppressed to only a slight deformation. Accordingly, upward inclination of the front end of the lower flange 22 (i.e., inclination toward the end surface of the magnetic tape T) is prevented. In addition, since the ring-shaped brim 33 is integrally formed, the upper flange 31 also has sufficient rigidity. This means that even if the hub 21 deforms slightly, downward inclination of the front end of the upper flange 31 is reliably prevented as the hub 21 deforms. Accordingly, sufficient clearance can be provided between the front end of the upper flange 31 and the magnetic tape T.

In this way, according to the tape reel 3 and the information recording medium 1, the hub 21 can be provided with sufficient rigidity by forming the plurality of reinforcing ribs 21b in the up-down direction in the inner circumferential surface of the trunk part 21a of the hub 21. This means that even if a large force is applied to the trunk part 21a due to the magnetic tape T being tightened, it is possible to keep the hub 21 in a non-deformed state or a state that is only slightly deformed. Accordingly, since it is possible to prevent inclination of the upper flange 31 toward the magnetic tape T side as the hub 21 deforms, sufficient clearance can be maintained between the ends of the magnetic tape T and the upper flange 31 even in a state where the magnetic tape is wound out.

Since the ring-shaped brim 33 is formed at a lower end of the protrusion 32 in the upper flange 31, even if the hub 21 deforms slightly, the protrusion 32 is reliably supported from an inside thereof by the ring-shaped brim 33, so that it is possible to reliably prevent inclination of the upper flange 31 toward the magnetic tape T side as the hub 21 deforms. As a result, it is possible to reliably maintain sufficient clearance between the front end of the upper flange 31 and the magnetic tape T.

Figure 5:
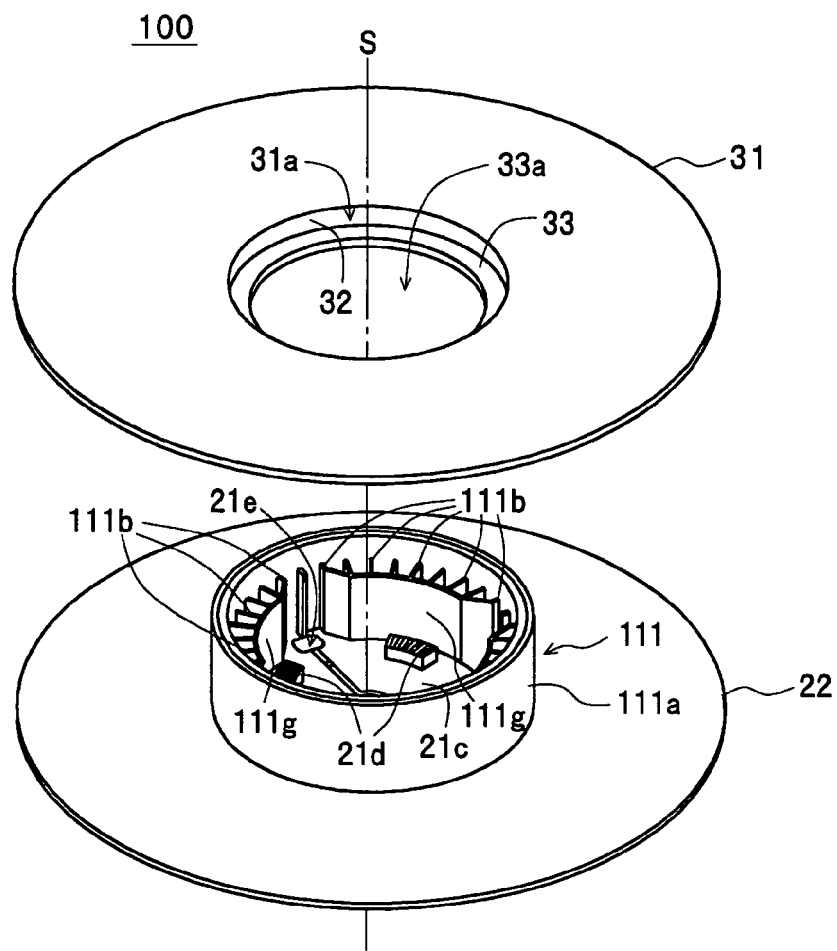
FIG. 5 is an exploded perspective view of another tape reel.
Figure 6:
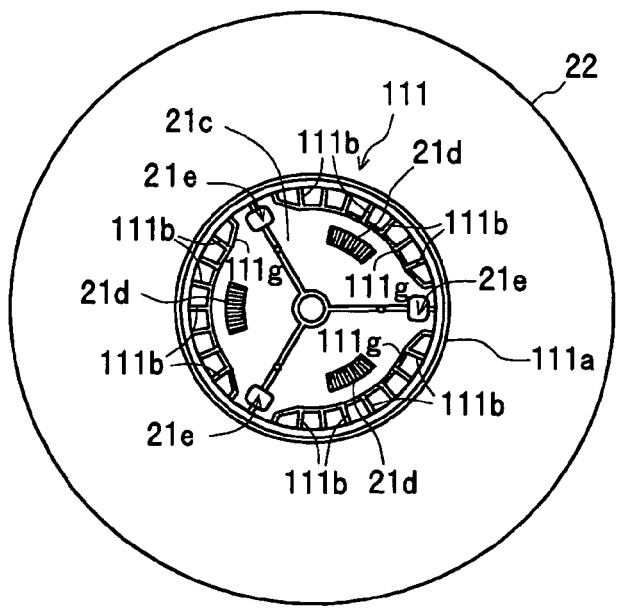
FIG. 6 is a plan view of another hub and lower flange.

Next, a tape reel 100 shown in FIG. 5 will be described. It should be noted that the present invention is fundamentally applied to the tape reel 100 and tape reels 101 to 104 described later in the same way as to the tape reel 3. Accordingly, component parts that are the same as the tape reel 3 have been assigned the same reference numerals and duplicated description thereof has been omitted. As shown in FIG. 5, the tape reel 100 is constructed so as to include a hub 111, the lower flange 22 and the upper flange 31. The hub 111 is shaped as a bottomed cylinder where an opening is formed at an upper end, and is constructed so that the magnetic tape T can be wound around a circumference thereof. Also, as shown in FIGS. 5 and 6, a plurality of reinforcing ribs 111b are formed in an up-down direction (a direction from an upper end to a lower end) at equal intervals on an inner circumferential surface of a trunk part 111a of the hub 111 so as to protrude toward a center axis S of the hub 111. Also, inside the trunk part 111a, three reinforcing wall members 111g in the form of thin plates are formed so as to connect the front ends of the reinforcing ribs 111b and to face the inner circumferential surface of the trunk part 111a. According to the tape reel 100, the plurality of reinforcing ribs 111b are formed in the up-down direction on the inner circumferential surface of the trunk part 111a in the hub 111 so as to protrude toward the center axis of the hub 111, and the reinforcing wall members 111g that face the inner circumferential surface of the trunk part 111a are also formed inside the trunk part 111a. As a result, the rigidity of the hub 111 with respect to a force applied toward the center axis S can be sufficiently increased, so that even if a large force is applied to the trunk part 111a due to the magnetic tape T being tightened, it is possible to keep the hub 111 in a non-deformed state or a state that is only slightly deformed. Accordingly, it is possible to prevent inclination of the lower flange 22 and the upper flange 31 toward the magnetic tape T side that accompanies deformation of the hub 111, so that sufficient clearance can be maintained between the lower flange 22 and upper flange 31 and also between the front ends of the magnetic tape T even in a state where the magnetic tape has been wound out.

Figure 7:
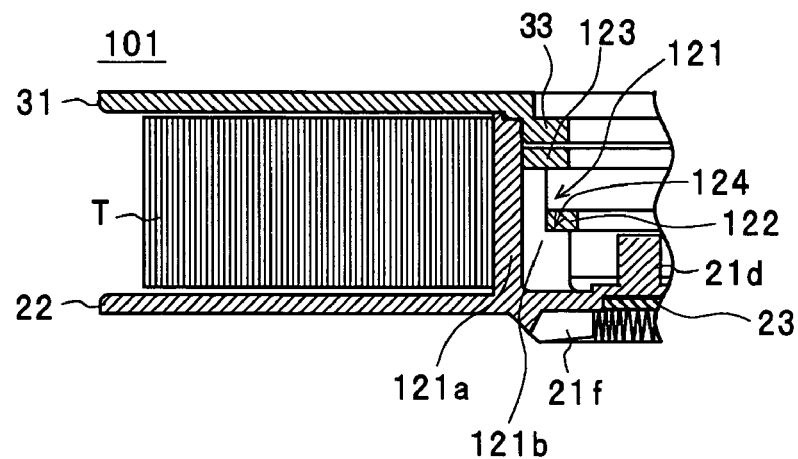
FIG. 7 is a cross-sectional view of another tape reel.

Next, a tape reel 101 shown in FIG. 7 will be described. As shown in FIG. 7, the tape reel 101 includes a hub 121, the lower flange 22, the upper flange 31, and reinforcing members 122, 123. The hub 121 is formed in the shape of a bottomed cylinder, with it being possible to wind a magnetic tape T around an outer circumference of a trunk part 121a thereof. Also, a plurality of reinforcing ribs 121b are integrally formed in an up-down direction at equal intervals on the inner circumferential surface of the trunk part 121a. In this case, as shown in FIG. 7, stepped parts 124 are formed in the reinforcing ribs 121b. The reinforcing member 122 is formed as a disc with a center hole and is fitted into and fixed to the trunk part 121a of the hub 121 with a lower surface thereof in contact with the respective stepped parts 124 of the reinforcing ribs 121b and an outer circumferential surface thereof in contact with side surfaces of the reinforcing ribs 121b. In this case, it is possible to use a construction where the reinforcing member 122 is fixed to the reinforcing ribs 121b by welding. The reinforcing member 123 is formed as a disc with a center hole and is fitted into and fixed to the trunk part 121a with a lower surface thereof in contact with upper surfaces of the reinforcing ribs 121b and an outer circumferential surface thereof in contact with an inner circumferential surface of the trunk part 121a. According to the tape reel 101, the trunk part 121a can be supported from the inside due to the plurality of reinforcing ribs 121b being integrally formed in the up-down direction on the inner circumferential surface of the trunk part 121a of the hub 121 and the reinforcing members 122, 123 being fitted into and fixed to the trunk part 121a, so that deformation of the trunk part 121a due to the magnetic tape T being tightened can be reliably prevented.

Figure 8:
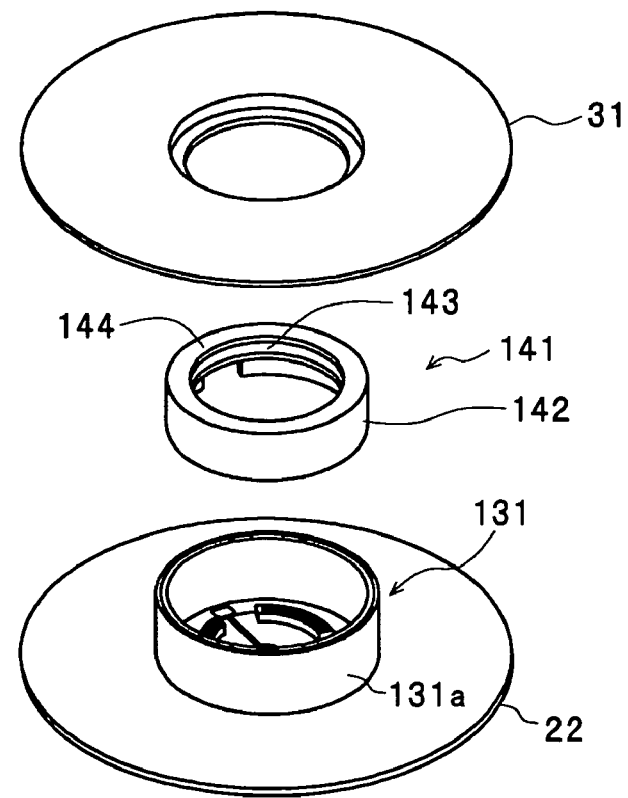
FIG. 8 is an exploded perspective view of another tape reel.
Figure 9:
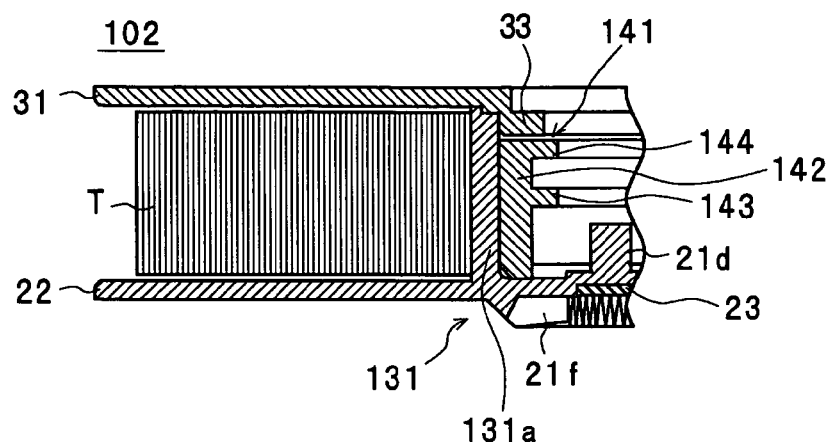
FIG. 9 is a cross-sectional view of another tape reel.
Figure 10:
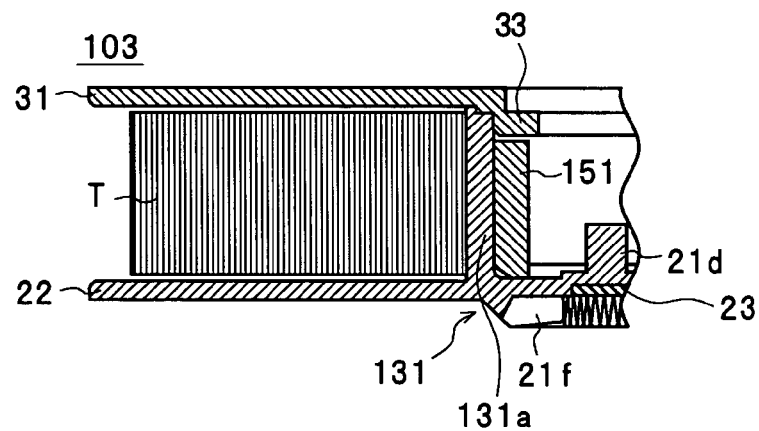
FIG. 10 is a cross-sectional view of another tape reel.

Next, a tape reel 102 shown in FIG. 8 will be described. As shown in FIGS. 8 and 9, the tape reel 102 includes a hub 131, the lower flange 22, the upper flange 31, and a reinforcing member 141. The hub 131 is shaped as a bottomed cylinder and is constructed so that the magnetic tape T can be wound around an outer circumference of a trunk part 131a thereof. In this case, unlike the hub 21 of the tape reel 3 described above, the hub 131 has a construction where reinforcing ribs are not formed in the trunk part 131a. The reinforcing member 141 is constructed of a cylindrical main body 142 and reinforcing plates 143, 144 that are formed on the inner circumferential surface of the main body 142 in the shape of discs with center holes (i.e., the reinforcing plates 143, 144 are ring-shaped). In this case, the reinforcing member 141 is fitted inside the trunk part 131a so that an outer circumferential surface of the main body 142 thereof contacts an inner circumferential surface of the trunk part 131a of the hub 131. In the tape reel 102, by fitting the reinforcing member 141 inside the trunk part 131a of the hub 131, the trunk part 131a is supported from the inside by the reinforcing member 141 so that it is possible to reliably prevent deformation of the trunk part 131a due to the magnetic tape T being tightened. By integrally forming the reinforcing plates 143, 144 on the inner circumferential surface of the main body 142, it is possible to increase the rigidity of the reinforcing member 141, so that the trunk part 131*a* can be reliably supported. It should be noted that as shown in FIG. 10, it is possible to use a tape reel 103 including, in place of the reinforcing member 141, a cylindrical reinforcing member 151 in which reinforcing plates have not been formed. With this construction also, it is possible to reliably prevent deformation of the trunk part 131*a* due to the magnetic tape T being tightened. In this case, by forming the reinforcing member 151 of metal, for example, it is possible to make the reinforcing member 151 thin while maintaining the rigidity.

Figure 11:
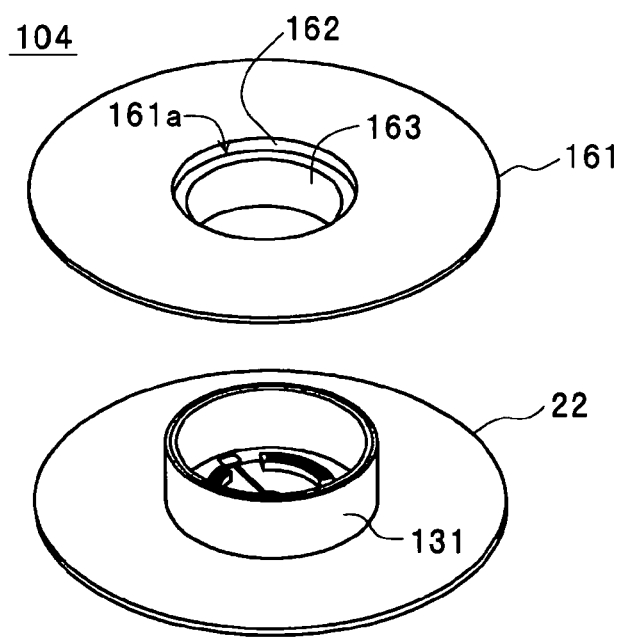
FIG. 11 is an exploded perspective view of another tape reel.
Figure 1:
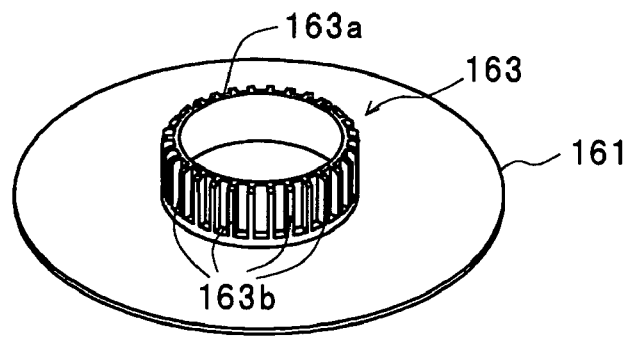
Figure 1:
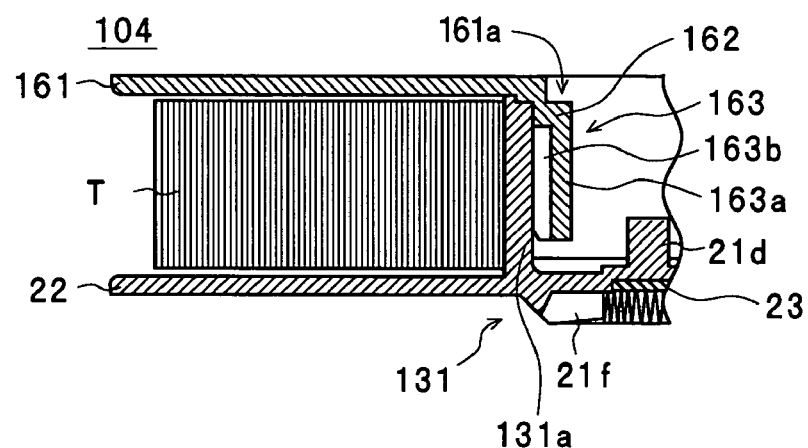
Figure 1:
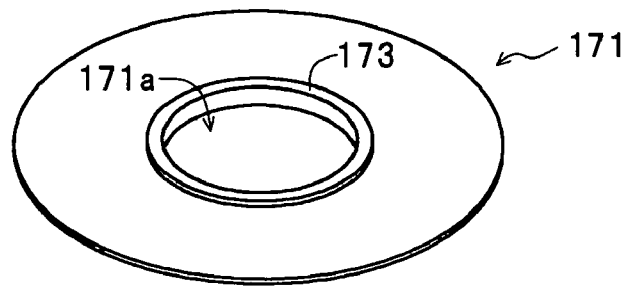

Next, a tape reel 104 shown in FIG. 11 will be described. As shown in FIGS. 11 and 13, the tape reel 104 includes the hub 131 described above, the lower flange 22, and an upper flange 161. As shown in FIG. 11, the upper flange 161 is constructed in a disc shape with a circular center hole 161*a* being formed in a center thereof. Also, as shown in FIGS. 11 and 13, a ring-shaped reinforcing protrusion 162 is formed so as to protrude downward at a rim of the center hole 161*a* of the upper flange 161. In addition, a reinforcing member 163 is formed at a lower end of the reinforcing protrusion 162. As shown in FIGS. 12 and 13, the reinforcing member 163 includes a cylindrical main part 163*a* and a plurality of ribs 163*b* that are integrally formed at equal intervals on the outer circumferential surface of the main part 163*a* and extend in the up-down direction (a direction from a base end toward a front end of the main part 163*a*). In this case, the width (protruding length) of the ribs 163*b* is set so that in a state where the upper flange 161 is fitted into the hub 131, side surfaces on the outer circumference side of the ribs 163*b* contact the inner circumferential surface of the trunk part 131*a* of the hub 131. According to the tape reel 104, by forming the reinforcing member 163 with the plurality of ribs 163*b* on a lower end of the reinforcing protrusion 162 of the upper flange 161, the rigidity of the upper flange 161 can be increased, so that even if the hub 131 deforms slightly, inclination of the upper flange 161 toward the magnetic tape T side as the hub 131 deforms can be prevented more reliably.

Figure 15:
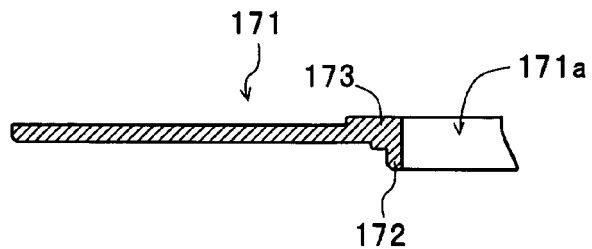
FIG. 15 is a cross-sectional view of another upper flange.

It should be noted that the present invention is not limited to the above construction. As one example, in place of the upper flange 31 of the tape reels 3, 100 to 103 and the upper flange 161 of the tape reel 104, it is possible to use an upper flange 171 shown in FIG. 14. In this case, as shown in FIG. 14, the upper flange 171 is formed in a disc shape, with a circular center hole 171*a* being formed in a center thereof. As shown in FIGS. 14 and 15, a protrusion 172 is formed so as to protrude downward at a rim of the center hole 171*a* on a lower surface side of the upper flange 171. In addition, a reinforcing protrusion 173 is formed so as to protrude upward at the rim of the center hole 171*a* on an upper surface side of the upper flange 171. That is, the rim of the center hole 171*a* of the upper flange 171 is formed thicker than other parts of the upper flange 171. According to the upper flange 171, since the rim can be provided with sufficient rigidity by forming the rim thicker than other parts, even if the hub (the hub, 21, 111, 121, 131) deforms slightly, inclination of the upper flange 171 toward the magnetic tape side as the hub deforms can be reliably prevented.

Figure 16:
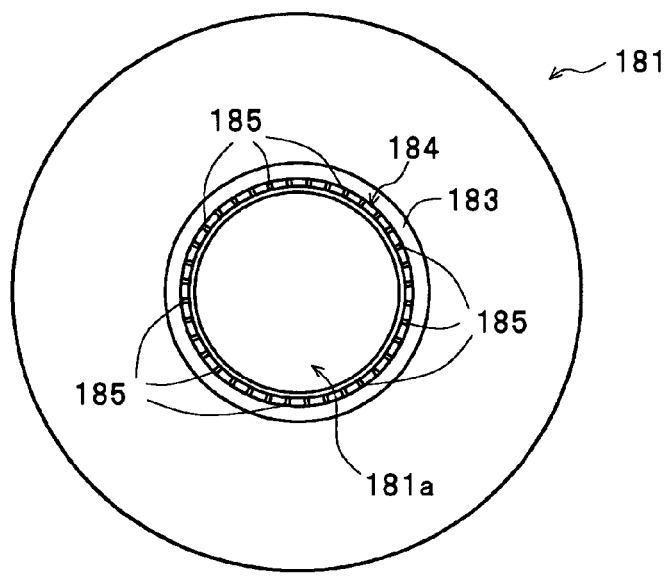
FIG. 16 is a plan view of another upper flange.
Figure 17:
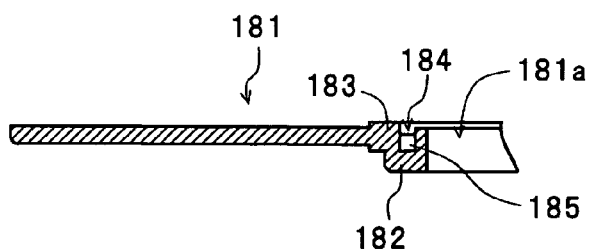
FIG. 17 is a cross-sectional view of another upper flange.

It is also possible to use an upper flange 181 shown in FIG. 16 in place of the upper flange 31, 161. In this case, as shown in FIG. 16, the upper flange 181 is formed in a disc shape, with a circular center hole 181*a* being formed in a center thereof. As shown in FIGS. 16 and 17, a protrusion 182 is formed so as to protrude downward at a rim of the center hole 181*a* on a lower surface side of the upper flange 181. In addition, a reinforcing protrusion 183 is formed so as to protrude upward at the rim of the center hole 181*a* on an upper surface side of the upper flange 181. That is, the rim of the center hole 181*a* of the upper flange 181 is formed thicker than other parts of the upper flange 181. Also, as shown in both drawings, a groove 184 that is ring-shaped when viewed from above is formed in the reinforcing protrusion 183 so as to surround the center hole 181*a*. In addition, a plurality of wall-like ribs 185, which connect a side wall on an outer edge side of the upper flange 181 and a side wall on the center hole 181*a* side, are formed inside the groove 184. For this upper flange 181 also, the rim is formed thicker than other parts, so that the rim can be provided with sufficient rigidity and even if the hub deforms slightly, inclination of the upper flange 181 toward the magnetic tape side as the hub deforms can be reliably prevented. Also, by forming the groove 184 in the reinforcing protrusion 183 and the plurality of ribs 185 inside the groove 184, it is possible to reduce the weight of the upper flange 181 and to prevent the occurrence of "sinking" in the reinforcing protrusion 183 while maintaining the rigidity of the rim.

Figure 18:
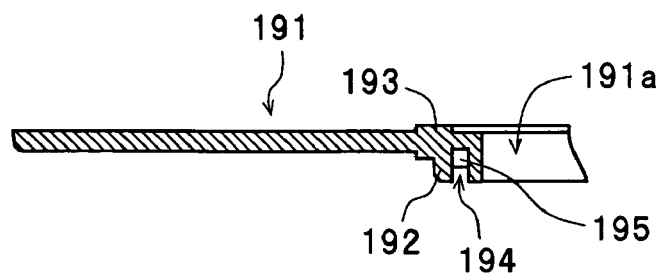
FIG. 18 is a cross-sectional view of another upper flange.

It is also possible to use an upper flange 191 shown in FIG. 18 in place of the upper flanges 31, 161. In this case, like the upper flange 181, the upper flange 191 is formed in a disc shape, with a circular center hole 191*a* being formed in a center thereof. As shown in FIG. 18, a protrusion 192 is formed so as to protrude downward at a rim of the center hole 191*a* on a lower surface side of the upper flange 191. In addition, a reinforcing protrusion 193 is formed so as to protrude upward at the rim of the center hole 191*a* on an upper surface side of the upper flange 191. In addition, a groove 194 that is ring-shaped when viewed from above is formed in a lower surface of the protrusion 192 and a plurality of wall-like ribs 195, which connect a side wall on an outer edge side of the upper flange 191 and a side wall on the center hole 191*a* side, are formed inside the groove 194. For this upper flange 191 also, the rim is formed thicker than other parts, so that the rim can be provided with sufficient rigidity. Also, by forming the groove 194 in the protrusion 192 and the plurality of ribs 195 inside the groove 194, it is possible to reduce the weight of the upper flange 191 and to prevent the occurrence of "sinking" in the protrusion 192 while maintaining the rigidity of the rim.

Figure 19:
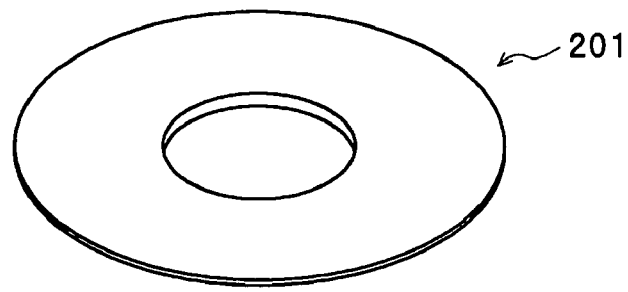
FIG. 19 is a perspective view of another upper flange.
Figure 20:
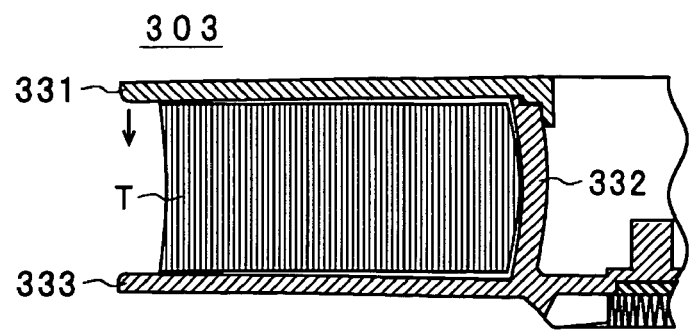
FIG. 20 is a cross-sectional view of a tape reel disclosed by the present applicant.

As shown in FIG. 19, it is also possible to use an upper flange 201, in which no ring-shaped brim 33 is formed, in place of the upper flange 31. Also, although the present invention has been described by way of an information recording medium 1 according to LTO standard, the information recording medium according to the present invention includes various kinds of single-reel-type information recording media, such as information recording media according to DLT (Digital Linear Tape) standard and information recording media according to SDLT (Super Digital Linear Tape) standard. Also, the present invention is not limited to single-reel-type media, and can also be applied to double-reel-type information recording media, such as video tapes.

What is claimed is:
1. A tape reel comprising:
a hub in the shape of a bottomed-cylinder with a disc-like lower flange integrally formed at a lower end thereof and an opening formed at an upper end thereof; and
an upper flange that is disc-like, has a center hole formed therein, and has a ring-shaped protrusion formed so as to protrude at a rim of the center hole, the protrusion being fitted into and fixed at the opening of the hub, wherein the hub includes a plurality of reinforcing ribs that are respectively formed in an up-down direction on an inner circumferential surface of the hub, the plurality of reinforcing ribs respectively protruding toward a center axis of the hub from the inner circumferential surface of the hub; and at least one reinforcing wall member formed so as to connect front ends of the respective reinforcing ribs and to face the inner circumferential surface.

2. A tape reel according to claim 1, wherein the upper flange is constructed so as to include a ring-shaped brim that is formed on the protrusion.

3. A tape reel according to claim 1, wherein the upper flange is constructed by forming a rim of the center hole thicker than other parts aside from the rim.

4. A tape reel according to claim 3, wherein the upper flange includes:

a ring-shaped groove formed in an upper surface of the rim so as to surround the center hole; and a plurality of ribs formed inside the groove.

5. A tape reel according to claim 3, wherein the upper flange includes:

a ring-shaped groove formed in a lower surface of the protrusion so as to surround the center hole; and a plurality of ribs formed inside the groove.

6. A tape reel according to claim 1, wherein the hub includes a disc-shaped reinforcing member that is fixed to the reinforcing ribs.

* * * * *